United States Patent Office 3,146,275
Patented Aug. 25, 1964

3,146,275
PROCESS FOR THE PREPARATION OF CHLORO-
FLUORO DERIVATIVES OF METHANE
Johannes Dahmlos, Haltern, Westphalia, Germany, assignor to Wasag-Chemie AG, Essen (Ruhr), Germany
No Drawing. Filed Apr. 13, 1961, Ser. No. 102,639
Claims priority, application Germany June 15, 1960
9 Claims. (Cl. 260—653.8)

This invention relates to a process for the preparation of chlorofluoro derivatives of methane, particularly difluorodichloromethane.

Halogenated methanes containing one or more fluorine atoms are widely used as refrigerants and propellants, and consequently, it is highly desirable to produce these compounds by an economical and simple process. To achieve these aims, several processes have been suggested. One of these processes encompasses the reaction of chlorinated hydrocarbons with sodium, barium or potassium silicofluorides at 250–300° C. under superatmospheric pressures in an autoclave capable of withstanding relatively high pressures. For example, sodium silicofluoride reacts with carbon tetrachloride at about 270° C. to produce a mixture of monofluorotrichloromethane and difluorodichloromethane, and as by-products silicon tetrafluoride and sodium chloride. If an excess of carbon tetrachloride is employed in this reaction, the conversion of sodium silicofluoride amounts to 90–100%. This latter method of reacting carbon tetrachloride and sodium silicofluoride in an autoclave on the other hand is disadvantageous from the standpoint that there are relatively wide fluctuations in the relative proportions of the various fluorochloro derivatives, thereby making the yield of the desired product more or less unpredictable. Furthermore, very often an undesirably large proportion of the less valuable monofluoro derivative, $CFCl_3$, is produced. Still further, it has been observed that the initiation of the reaction is not always clearly discernible, and because of this, a time lag may occur and it may be necessary to heat the reaction to higher than 270° C., i.e. 270–280° C.

Another possible disadvantage of this process resides in the fact that it is dependent on sodium or potassium or barium silicofluorides as raw materials. Whereas these compounds are usually found as by-products, particularly the sodium silicofluoride, it is possible that in the future the processes from which they are obtained may become obsolete. For example, sodium silicofluoride is obtained as a by-product from superphosphate production, but in recent years, there has been an indication that the electric furnace production of the phosphorus may in fact reduce the market for superphosphate. Consequently, though the silicofluorides may be readily available at the present time, there is a possibility that they may not be readily available in the future.

The object of the present invention is to provide an improved process for the production of chlorofluoro derivatives of methane.

A particular object of the present invention is to provide a process which is not subject to fluctuation in yields of the various chlorofluoroderivatives of methane.

Another particular object is to provide a process yielding only minor amounts of monofluorotrichloromethane.

A further particular object of the present invention is to substantially eliminate the time lag that sometimes occurs in the initiation of the reaction between the silicofluoride and the halogenated hydrocarbon.

A still further particular object is to utilize a raw material which is not dependent on the superphosphate industry.

These and other objects and advantages of the present invention will become apparent upon further study of the specification and appended claims.

To obtain the objects and advantages of the present invention, it has been found that the introduction of a small amount of catalyst, particularly a ferric halide and more particularly ferric chloride will markedly improve the process. Further, it has been found that it is possible to employ fluorspar ($CaF_2$) as the raw material which is consumed.

By the utilization of this ferric halide catalyst, it is possible to direct the fluorination so that a preponderance of difluorodichloromethane is produced. As a matter of fact, in a continuous process employing the ferric halide catalyst, there is obtained a molar proportion of dichlorodifluoromethane to monofluorotrichloromethane of 5:1 respectively. This five to one mixture can be used directly as a propellant without any intervening separation of its components, thereby making the process of the present invention markedly improved over prior art processes.

On the other hand, if it is necessary to produce relatively pure difluorodichloromethane, it is easily accomplished by fractional distillation. Furthermore, the bottoms comprising monofluorotrichloromethane may be recycled and further reacted with sodium silicofluoride in contact with a ferric halide. It is highly important to note that by means of the catalyst of this invention, it is possible to convert the monofluorotrichloromethane into difluorodichloromethane, but it is impossible to do this without the addition of the ferric halide. Consequently, not only is the ferric halide catalyst beneficial from the standpoint that it directs the fluorination reaction to a preponderance of the difluorodichloromethane, but it is also possible to recycle the monofluorotrichloromethane in order to produce the difluorodichloromethane exclusively.

In addition to the ferric halide catalyst being able to direct the formation of the desired products, this catalyst also increases the rate of reaction. For example, at 200° C., it is seen that the reaction between the sodium silicofluoride and carbon tetrachloride is initiated. At 240–250° C. with the catalyst, the reaction proceeds at least as fast as the conversion at 270–280° C. without the catalyst. Consequently, it is possible to reduce the reaction temperature by at least 30° C., thereby resulting in savings from the energy standpoint.

The advantages of the present invention are obtained not only with the sodium silicofluoride as outlined supra, but also with the potassium and barium silicofluorides.

The amount of ferric halide catalyst that is required is relatively small. Based on the weight of silicofluorides only about 1–5% by weight of ferric halide is necessary to obtain the advantages of the present invention. The known ferric halides are ferric fluoride, ferric chloride and ferric bromide. Whereas all of these ferric halides are operable in this invention, it is preferred to use ferric chloride.

When a silicofluoride and carbon tetrachloride are reacted in an autoclave, not only are chlorofluoro derivatives of methane obtained, but also sodium chloride, and silicon tetrafluoride are produced as by-products. The sodium chloride residue in the autoclave can be extracted by means of an aqueous solution such as water. The silicon tetrafluoride is withdrawn from the autoclave preferably during the reaction through a pressure resistant cooling tube.

Dependent upon the mode of absorption of the silicon tetrafluoride emanating from the reaction, there are at least two distinct embodiments for conducting the method of the present invention. If the silicon tetrafluoride is absorbed in water, there is obtained a solution of fluosilicic acid and a precipitate of silicic acid. By adding a solution of sodium chloride to the fluosilicic acid solution, about two-thirds of the initial sodium fluosilicate can be recovered. (The added sodium chloride solution is obtained by extracting the residue remaining in the autoclave with water, and its addition is conducted only after the precipitated silicic acid is removed from the solution of fluosilicic acid). This embodiment therefore proceeds in accordance with the following equation:

$$Na_2SiF_6 + 3CCl_4 + 2H_2O = 3CF_2Cl_2 + 2NaCl + 4HCl + SiO_2$$

From a study of this equation, it is seen that the process is dependent on sodium silicofluoride as a source of fluorine. In view of the fact that sodium silicofluoride is a by-product from the production of superphosphate, and in further view of the fact that superphosphate may become less extensively used as a fertilizer, it is questionable whether the source of sodium silicofluoride will always be sufficient for the industrial production of chlorofluoro derivatives of methane in larger amounts.

From that standpoint it appears to be more suitable to use another embodiment of this invention which utilizes fluorospar instead of sodium fluosilicate as the source of fluorine. Because fluorspar is a mineral occurring in abundant amounts throughout the world, its availability is unquestionably ensured. In this embodiment fluorspar is utilized by reacting it with the silicon tetrafluoride to form the dihydrate of calcium fluosilicate, $CaSiF_6 \cdot 2H_2O$. The sodium fluosilicate that is utilized in the autoclave can be reconverted in a simple manner by means of a sodium chloride solution. However, in this embodiment of the invention, the sodium fluosilicate is not consumed, but is merely used as a means for exchanging halogens. The overall reaction proceeds in accordance with the following equation:

$$CaF_2 \text{ (fluorspar)} + CCl_4 = CaCl_2 + CF_2Cl_2$$

Though the above equation represents an overall reaction of the preferred embodiment of the present invention, it is to be noted that if fluorspar and carbon tetrachloride are reacted directly, even with the utilization of high temperatures, there is only a very minor extent of halogen exchange. As a matter of fact, only one fluorine atom of the calcium fluoride can be replaced by a chlorine atom. Because of this known fact, heretofore the utilization of fluorspar to produce chlorofluoro derivatives of methane and other aliphatic hydrocarbons by direct reaction has been considered impossible for all practical purposes, and has consequently never been seriously considered from an economic viewpoint. In contrast, methods disclosed in the prior art have utilized sulphuric acid to contact fluorspar in order to produce hydrogen fluoride which in turn could, in the presence of suitable catalysts, fluorinate a chlorinated aliphatic hydrocarbon. Of course, the method of the present invention does not require any sulphuric acid, and thereby the process of the present invention is substantially more efficient from the economic standpoint.

Another advantage of the present invention is obtained from the fact that the only gaseous by-product from the reaction is silicon tetrafluoride. In contrast, the method employing hydrogen fluoride produces other gaseous by-products such as hydrogen chloride, hydrogen fluoride and also catalyst components of antimony and halogens, thereby necessitating a difficult and relatively expensive refining operation. In contradistinction, the present invention produces chlorofluoro compounds which are substantially pure.

As the chlorinated methanes usable as raw materials for the instant invention, there can be employed either carbon tetrachloride or monofluorotrichloromethane.

The following examples refer to specfic embodiments of this invention and are merely illustrative and are not limitative of the invention as expressed in the specification and appended claims. Accordingly, the temperatures, pressures and concentrations mentioned in the examples, being not critical, are not to be construed as defining the invention.

*Example 1*

A 2 liter steel jacketed autoclave is charged with 564 grams (3.0 moles) of finely divided dry sodium fluosilicate and mixed with 20 grams of anhydrous ferric chloride and 700 grams (4.5 moles) of carbon tetrachloride. To the autoclave is connected first an ice-cooled trap having a volume of about 300 ml., and in series with said trap an absorption device consisting of a 2 liter, 3 necked flask equipped with a stirrer. This absorption device is charged with 234 grams of fluorspar (97.4% $CaF_2$, 0.7% $SiO_2$) and is further charged with 1 liter of fluosilicic acid having a specific gravity of 1.35. Further in series, the absorption device is connected to a gas cleaning system comprising a first wash tower containing water and a second wash tower containing 20% of potash lye, and a second trap cooled by dry ice having a volume of about 500 ml. for receiving the reaction products. After this second trap is positioned a drying tower charged with calcium chloride to protect the apparatus and its ingredients from the humidity in the air. The last piece of apparatus in the series is a wash bottle containing water which is used as a bubble counter.

During the process the fluorspar is heated to 40° C. and vigorously stirred in the absorption device in order to keep the fluorspar in suspension.

The autoclave is heated by any conventional heat transfer system so that after an hour a temperature of about 220° C. is reached. At this temperature the pressure is about 30 atmospheres gauge which is to be compared with the vapor pressure of carbon tetrachloride at that temperature of about 20 atmospheres gauge. At about 240° C. (corresponding to about 50 atmospheres gauge), the reaction becomes so rapid that the temperature actually decreases about 10° C. while the pressure increases. Additional external heating is employed to increase the temperature, and when the pressure in the autoclave reaches about 80 atmospheres gauge, the valve is opened so that silicon tetrafluoride gas can pass from the autoclave into the absorption system. It is seen, then, in this example that the process is conducted in a confined reaction zone under an autogenous pressure maintained at less than about 80 atmospheres gauge. Consequently, in the first wash tower there is no appreciable precipitation of silicic acid. After the stream of silicon tetrafluoride gas is adjusted to the maximum permissible rate, the temperature of the autoclave is slowly increased so that the pressure therein does not fall below 60 atmospheres gauge. When the temperature reaches 280° C. and the pressure tends to drop below the 60 atmospheres value, the valve is closed and the temperature is kept constant at 280° C. until there is no further pressure increase. By this technique, the conversion of sodium silicofluoride is made as complete as possible.

Once there is an indication that there is no further pressure increase, the autoclave heater is turned off and immediately thereafter, the pressure in the autoclave is substantially decreased within about 1 hour. After silicon tetrafluoride is removed, by the absorption device, a rapid condensation of the fluorine-containing reaction product occurs in the second cooling trap. Towards the end of the pressure decrease in cooling trap 1, most of the unconverted carbon tetrachloride and some of the monofluorotrichloromethane is collected. After the pressure is completely relieved so that there is no super atmospheric pressure, the apparatus is cleaned with the air for about ten minutes. To collect the volatile portions remaining in the warm autoclave, there is connected to this autoclave a suction pump via a cooling trap. The volatile condensation products are recovered and combined with the contents of the first cooling trap.

By means of the latter described process, there is obtained in the second cooling trap about 358 grams of a pure mixture of 61 grams of monofluorotrichloromethane and 297 grams of difluorodichloromethane, the mole proportion of difluorodichloromethane to monofluorotrichloromethane being 5.6 to 1. In the first cooling trap, there is recovered about 202 grams comprising a mixture of 137 grams of carbon tetrachloride and 65 grams of monofluorotrichloromethane which mixture preferably is eventually recycled to the autoclave for further conversion with additional sodium silicofluoride.

An examination of the contents of the absorption device shows that there is a gain in weight of 303 grams, corresponding to 2.92 moles of silicon tetrafluoride. The fluorspar which had been in suspension is now changed into a crystalline pulp comprising the dihydrate of calcium silicofluoride, which is substantially insoluble in the suspension medium. This crystalline pulp is then filtered and washed with enough water to bring the volume of the filtrate plus the wash water to a volumetric content of about 1 liter. This filtrate and wash water contains fluosilicic acid and has a specific gravity of 1.34. In view of the fact that there is substantially no change in the specific gravity between the fresh fluosilicic acid and the recovered fluosilicic acid, it is possible to repeatedly utilize the fluosilicic acid as the suspension medium for additional charges of fluorspar.

The filter cake is treated with 2 liters of a 5% hydrochloric acid solution at elevated temperatures whereby it is practically completely dissolved. A small insoluble portion of about 7.5 grams comprising the unconverted fluorspar and the impurities therein, i.e., $SiO_2$, $BaSO_4$, $Al_2O_3$, and $Fe_2O_3$, is removed by filtration, thereby obtaining a clear solution of calcium fluosilicate.

The residue remaining in the autoclave, comprising primarily sodium chloride, is extracted by means of water. With the exception of 8 grams of unconverted sodium fluosilicate, this mass is completely dissolved. The solution obtained is one containing sodium chloride but which is colored by the ferric chloride added to the solution. The sodium chloride solution is then added to the clear solution of calcium fluosilicate to precipitate sodium silicofluoride. After the precipitate is filtered and dried, it weighs about 504 grams.

In a second test, the product collected in the first trap of the first test is added to 450 grams of pure carbon tetrachloride, and this resulting mixture is then reacted with 564 grams (3.0 moles) of sodium silicofluoride. From this reaction there results in the second trap an amount of 376 grams consisting of 35 grams of monofluorotrichloromethane and 341 grams of difluorodichloromethane, the mole proportion being 11.3:1. In the first trap, there is found 188 grams including 122 grams of carbon tetrachloride and 66 grams of monofluorotrichloromethane. This latter mixture is then mixed with fresh carbon tetrachloride and the reaction repeated.

After six tests using the product from the first trap in the succeeding step the following results are obtained.

From a charge of 2.9 kilograms $CCl_4$ (18.8 moles) and 3.38 kilograms $Na_2SiF_6$ (18.0 moles) there was obtained 1.85 kilograms $CF_2Cl_2$ (15.3 moles) and 0.33 kilogram $CFCl_3$ (2.4 moles), corresponding to an average mole ratio of $CF_2Cl_2:CFCl_2=6.4:1$. During the six tests 1.79 kilograms $SiF_4$ (17.2 moles) were obtained, and reacted with 1.3 kilograms $CaF_2$ (16.7 moles) to $CaSiF_6$. From this latter salt, about 3.09 kilograms $Na_2SiF_6$ (16.4 moles) were ultimately regained. The loss of $Na_2SiF_6$ amounted to about 9%, due to its solubility in the precipitating and washing fluids as well as due to the fact that the $Na_2SiF_6$ in the autoclave residue was not used again.

*Example 2*

A 2-liter steel autoclave was charged with 188 grams (1.0 mole) finely divided dry $Na_2SiF_6$ and with 375 grams $CFCl_3$ (2.7 moles). The autoclave was heated to and maintained at 280° C. until no further pressure increase was observed. The final pressure amounted to 46 atmospheres gauge. After cooling to room temperature, there was a residual pressure of 4 atmospheres gauge. The pressure in the cooled autoclave was then reduced in a device similar to the one described in Example 1. In the absorption device charged solely with water, only 2.64 grams $SiF_4$ (0.025 mole) were absorbed. By extracting the autoclave residue with water, there was recovered about 2.93 grams NaCl (0.05 mole).

The collected volatile products were fractionally distilled thereby yielding 15.5 grams $CCl_4$ (.1 mole), 317 grams $CFCl_3$ (2.27 moles), and only 15 grams $CF_2Cl_2$ (0.12 mole).

*Example 3*

A 2-liter steel autoclave was charged with 282 grams of dry, finely divided $Na_2SiF_6$ (1.5 moles) which was mixed with 10 grams of anhydrous ferric chloride and was further mixed with 413 grams $CFCl_3$ (3.0 moles). The autoclave then was heated to 280° C. and was maintained at that temperature until no further temperature increase was observed. The final pressure amounted to 82 atmospheres gauge. After cooling down to room temperature, there was observed a residual pressure of 19 atmospheres gauge. The pressure of the cooled autoclave then was reduced as outlined in Example 1. The absorption device was charged with water and during the reaction absorbed 109 grams $SiF_4$ (1.05 moles). A determination of chloride in the water used to extract the residue in the autoclave resulted in 130 grams NaCl (2.22 moles).

The fractionation of the collected volatile portion yielded 30 grams $CCl_4$ (0.20 mole), 57 grams $CFCl_3$ (0.41 mole), and 253 grams $CF_2Cl_2$ (2.09 moles). The presence of the ferric chloride thus resulted in a considerable exchange of halogens between the $Na_2SiF_6$ and $CFCl_3$, more than two-thirds of the $CFCl_3$ being converted into $CF_2Cl_2$.

With respect to the temperatures of the fluorination reaction, it is obvious that operable temperatures are to be utilized, preferably at least 200° C., and more preferably 200–300° C.

As to the reaction of silicon tetrafluoride with fluorspar, again operable temperatures are contemplated to form calcium silicofluoride dihydrate, but it is preferred to conduct this reaction at a range of 30–60° C. For the sake of convenience, it is preferable for the fluorspar particles to be suspended in fluosilicic acid solution, thereby forming the calcium silicofluoride dihydrate.

What I claim is:

1. A process for the production of difluorodichloromethane, which comprises reacting a highly chlorinated methane from the group consisting of carbon tetrachloride and monofluorotrichloromethane, with a silicofluoride selected from the group consisting of sodium, potassium and barium silocofluorides, said reaction being conducted in a confined reaction zone under autogenous pressure maintained at below about 80 atmospheres gauge, at a temperature of at least 200° C., and in contact with a ferric halide catalyst selected from the group consisting of ferric fluoride, ferric chloride, and ferric bromide, said ferric halide being present in a concentration of about 1–5% by weight, based on the silicofluoride, thereby increasing the rate of reaction and yield of difluorodichloromethane.

2. The process of claim 1, wherein the highly chlorinated methane is carbon tetrachloride.

3. The process of claim 1, wherein the highly chlorinated methane is monofluorotrichloromethane.

4. The process of claim 1, wherein the ferric halide is ferric chloride.

5. The process of claim 1, wherein the silicofluoride is sodium silicofluoride.

6. The process of claim 1, wherein the highly chlorinated methane is carbon tetrachloride, the ferric halide is ferric chloride, and the silicofluoride is sodium silicofluoride.

7. The process of claim 1, wherein the highly chlorinated methane is monofluorotrichloromethane, the ferric halide is ferric chloride, and the silicofluoride is sodium silicofluoride.

8. A process for the production of dichlorodifluoromethane, which comprises reacting a highly chlorinated methane selected from the group consisting of carbon tetrachloride and monofluorotrichloromethane, with sodium silicofluoride, said reaction being conducted in a confined reaction zone under an autogenous pressure maintained at below about 80 atmospheres gauge, at a temperature of at least 200° C., and in contact with ferric chloride being present in a concentration of 1–5% by weight based on the sodium silicofluoride, thereby forming dichlorodifluoromethane as a product and silicon tetrafluoride as a by-product gas, contacting said by-product gas with fluorspar to form calcium fluosilicate, reacting said calcium fluosilicate with sodium chloride to form sodium silicofluoride and calcium chloride, and recycling said sodium silicofluoride to the fluorination reaction.

9. A process for the production of dichlorodifluoromethane, which process comprises reacting a highly chlorinated methane selected from the group consisting of carbon tetrachloride and monofluorotrichloromethane with a silicofluoride selected from the group consisting of sodium, potassium and barium silicofluorides, said reaction being conducted in a confined reaction zone under an autogenous pressure maintained at below about 80 atmospheres gauge, at a temperature of at least 200° C., and in contact with ferric chloride present in a concentration of 1–5% by weight based on the silicofluoride, thereby forming dichlorodifluoromethane as a product, and silicon tetrafluoride as a by-product gas, contacting said by-product gas with fluorspar to form calcium fluosilicate, reacting said fluosilicate with a chloride salt having a cation corresponding to the cation of the silicofluoride salt used in the formation of dichlorodifluoromethane, to form calcium chloride and a newly prepared silicofluoride salt, and recycling said newly prepared silicofluoride salt to the fluorination reaction.

References Cited in the file of this patent
UNITED STATES PATENTS

| | | |
|---|---|---|
| 1,685,628 | Buchner | Sept. 25, 1928 |
| 2,924,624 | Forshey | Feb. 9, 1960 |
| 2,935,531 | Dahmlos | May 3, 1960 |

FOREIGN PATENTS

| | | |
|---|---|---|
| 1,190,698 | France | Oct. 14, 1959 |
| 800,758 | Great Britain | Sept. 3, 1958 |